United States Patent
Rantze et al.

(10) Patent No.: US 6,726,094 B1
(45) Date of Patent: Apr. 27, 2004

(54) METHOD AND APPARATUS FOR MULTIPLE FORMAT IMAGE CAPTURE FOR USE IN RETAIL TRANSACTIONS

(75) Inventors: Edward G. Rantze, Lawrenceville, GA (US); Joseph M. Lindacher, Duluth, GA (US); Charles Kenneth Wike, Sugar Hill, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/488,059

(22) Filed: Jan. 19, 2000

(51) Int. Cl.$^7$ .............. G06F 17/60; G06F 7/08; H04N 7/18
(52) U.S. Cl. ............ 235/379; 235/381; 235/462.11; 348/150; 705/16; 705/18; 705/21; 705/23
(58) Field of Search ............ 186/61, 59; 235/462.11, 235/462.13, 462.41, 379, 381; 705/16–25; 348/150; 725/60

(56) References Cited

U.S. PATENT DOCUMENTS

| | | | |
|---|---|---|---|
| 3,774,014 A | * 11/1973 | Berler | |
| 4,542,528 A | 9/1985 | Sanner et al. | 382/62 |
| 4,964,053 A | * 10/1990 | Humble | 364/466 |
| 4,991,008 A | * 2/1991 | Nama | 358/108 |
| 5,115,888 A | * 5/1992 | Schneider | |
| 5,396,054 A | 3/1995 | Krichever et al. | 235/462 |
| 5,434,403 A | * 7/1995 | Amir et al. | 235/472 |
| 5,497,314 A | * 3/1996 | Novak | 364/403 |
| 5,591,952 A | 1/1997 | Krichever et al. | 235/462 |
| 5,679,941 A | * 10/1997 | Iizaka et al. | 235/383 |
| 5,747,784 A | * 5/1998 | Walter et al. | 235/383 |
| 5,796,088 A | 8/1998 | Wall | 235/472 |
| 5,806,071 A | * 9/1998 | Balderrama et al. | 707/104 |
| 5,821,518 A | 10/1998 | Sussmeier et al. | 235/462 |
| 5,832,463 A | * 11/1998 | Funk | 235/379 X |

(List continued on next page.)

FOREIGN PATENT DOCUMENTS

| JP | 404233690 | * 8/1992 |
| JP | 5-266358 | * 10/1993 |
| JP | 10-136302 | * 5/1998 |
| JP | 10-233989 | * 9/1998 |

OTHER PUBLICATIONS

"Video Juggernaut: AT&T Microelectronics Unveils Codec Chips", The Report on AT&T, vol. 10, No. 14, Apr. 6, 1992.*

*Primary Examiner*—Steven B. McAllister
(74) *Attorney, Agent, or Firm*—Priest & Goldstein, PLLC

(57) ABSTRACT

A customer self-service terminal for use in conducting retail transactions. The terminal includes a camera having multi-mode image capability. When a customer wishes to conduct a transaction, the camera is used to scan product barcodes. The camera is set to capture an image of a barcode for extraction of data contained in the barcode. When all desired products have been scanned, the camera is used to record steps in the tendering of payment. The customer presents a financial identification card such as a credit or debit card and swipes it through a magnetic stripe reader. The customer then places the card in the field of view of the camera which is set to a video graphic mode to capture an image of the card for storage. The customer is then presented with a transaction document for signing. The camera is set to a live video mode to record the act of signing. After the transaction document has been signed, the camera captures an image of the signature. The captured images are associated with the transaction record and stored along with the transaction record, and the transaction is completed. The camera may also be set to provide a live video feed, which may be used sent to a remote security station for monitoring by a store employee.

8 Claims, 3 Drawing Sheets

U.S. PATENT DOCUMENTS

| | | | |
|---|---|---|---|
| 5,859,414 A | * | 1/1999 | Grimes et al. ............... 235/383 |
| 5,895,453 A | * | 4/1999 | Cook ........................... 705/22 |
| 5,920,056 A | * | 7/1999 | Bonnet ....................... 235/383 |
| 5,923,017 A | * | 7/1999 | Bjorner et al. .............. 235/385 |
| 5,953,055 A | * | 9/1999 | Huang et al. ................ 348/155 |
| 5,969,317 A | * | 10/1999 | Espy et al. .................. 235/378 |
| 5,984,186 A | * | 11/1999 | Tafoya ................... 235/462.24 |
| 5,992,570 A | * | 11/1999 | Walter et al. .................. 186/36 |
| 6,023,688 A | * | 2/2000 | Ramachandran et al. ..... 705/44 |
| 6,038,553 A | * | 3/2000 | Hyde, Jr. ..................... 705/45 |
| 6,236,736 B1 | * | 5/2001 | Crabtree et al. ............ 382/103 |
| 6,296,187 B1 | * | 10/2001 | Sheareer ................ 235/462.14 |
| 6,343,739 B1 | * | 2/2002 | Lippert ................... 235/379 X |
| 6,397,194 B1 | * | 5/2002 | Houvener et al. ............ 705/16 |

* cited by examiner

METHOD AND APPARATUS FOR MULTIPLE FORMAT IMAGE CAPTURE FOR USE IN RETAIL TRANSACTIONS

FIELD OF THE INVENTION

The present invention relates generally to image capture in a retail data terminal. More particularly, the invention relates to a device for providing a multiple-format image capture in a customer self-service terminal.

BACKGROUND OF THE INVENTION

Video capture capability is a useful feature of point of sale and customer service terminals commonly used in retail outlets. Video capture may include capture of bar code labels for analysis in order to provide product identification for price verification or access to product descriptions and information or to process a sales transaction. Video capture may further include capture of a credit card image or customer signature as part of a retail transaction, or a visual image of a customer in order to provide increased security and verifiability for a transaction.

Video capture is useful in many retail applications, but is particularly valuable for self-service terminals. Video capture allows a customer to present a bar code label or other visual image to the terminal. The terminal then captures the visual image and then extracts data from the visual image. The data may then be used, for example, as an index to a database for quick and positive identification of a product in order to allow the terminal to provide information about the product.

Further details of various aspects of image capture and data extraction are disclosed in Espy U.S. Pat. No. 5,969,317, which is assigned to the assignee of the present invention and is incorporated by reference herein in its entirety. Espy addresses a grayscale image capture and analysis of the image in order to extract data to be used to identify the image. Various aspects of image capture and data extraction are also disclosed in U.S. Pat. No. 6,366,696, assigned to the assignee of the present invention and incorporated by reference herein in its entirety. This application addresses image capture and analysis in order to locate a barcode label and analysis of the barcode label and associated human-readable numbers in order to extract the numerical data represented by the barcode label and independently by the numbers.

Video capture also makes transactions at self-service terminals more secure, because it allows the capture and retention of data needed to verify a transaction, such as a customer credit or debit card image, a customer signature, or a visual image of the customer.

Typical video capture devices of the prior art are dedicated, single purpose devices. For example, a terminal may be equipped with a bar code scanner, a signature capture device, and a camera. The inclusion of multiple different video capture devices adds to the cost and complexity of a terminal. Low cost is particularly advantageous in the case of self-service terminals, because the less a terminal costs, the more terminals can be provided, increasing convenience for the customer because of the greater likelihood of finding a free terminal in the customer's immediate vicinity. Similarly, simplicity of operation greatly increases the appeal of a self-service terminal, because of the greater likelihood that the customer will be able to operate it successfully without careful reading of instructions.

There exists, therefore, a need in the art for a video capture device for use with a retail terminal, which will capture an image in one of multiple formats, as required. Self-service customer terminals are gaining in popularity among retailers, because they reduce labor costs by reducing the need for a retail employee to process routine transactions. Self-service terminals also increase customer convenience because they provide a quick and easy way for customers to obtain answers to questions without a need to find a retail employee able to assist them. Because of the relatively low cost of self-service terminals, it is possible for a retailer to place a relatively large number of terminals in a retail establishment, allowing a greater likelihood that a customer will be able to find a conveniently located terminal and will be able to use the terminal without needing to wait.

SUMMARY OF THE INVENTION

A terminal according to the present invention includes a processor which controls the operation of a multi-mode image capture device such as a charge-coupled device (CCD) or complementary metal-oxide semiconductor (CMOS) imager. The terminal includes a user interface to allow commands to be issued to the processor for processing of requests and financial transactions, and for designation of image capture modes. The processor determines the format of an image to be captured depending on instructions from a user or in response to a predetermined program being executed by the processor. When it is desired to capture an image, the processor issues an appropriate command to the imager and the imager then captures an image of whatever is within the field of the view of the imager and transfers the image to a memory buffer. The processor designates the format of the image residing in the memory buffer and processes or stores it as appropriate. For example, an image of a bar code will be analyzed and processed to extract the bar code data. A video clip or similar image of the customer's act of signing a receipt, as well as a signature image of the signed receipt, will be stored together with details of the associated transaction.

A more complete understanding of the present invention, as well as further features and advantages of the invention, will be apparent from the following Detailed Description and the accompanying drawings.

DETAILED DESCRIPTION

Figure 1:
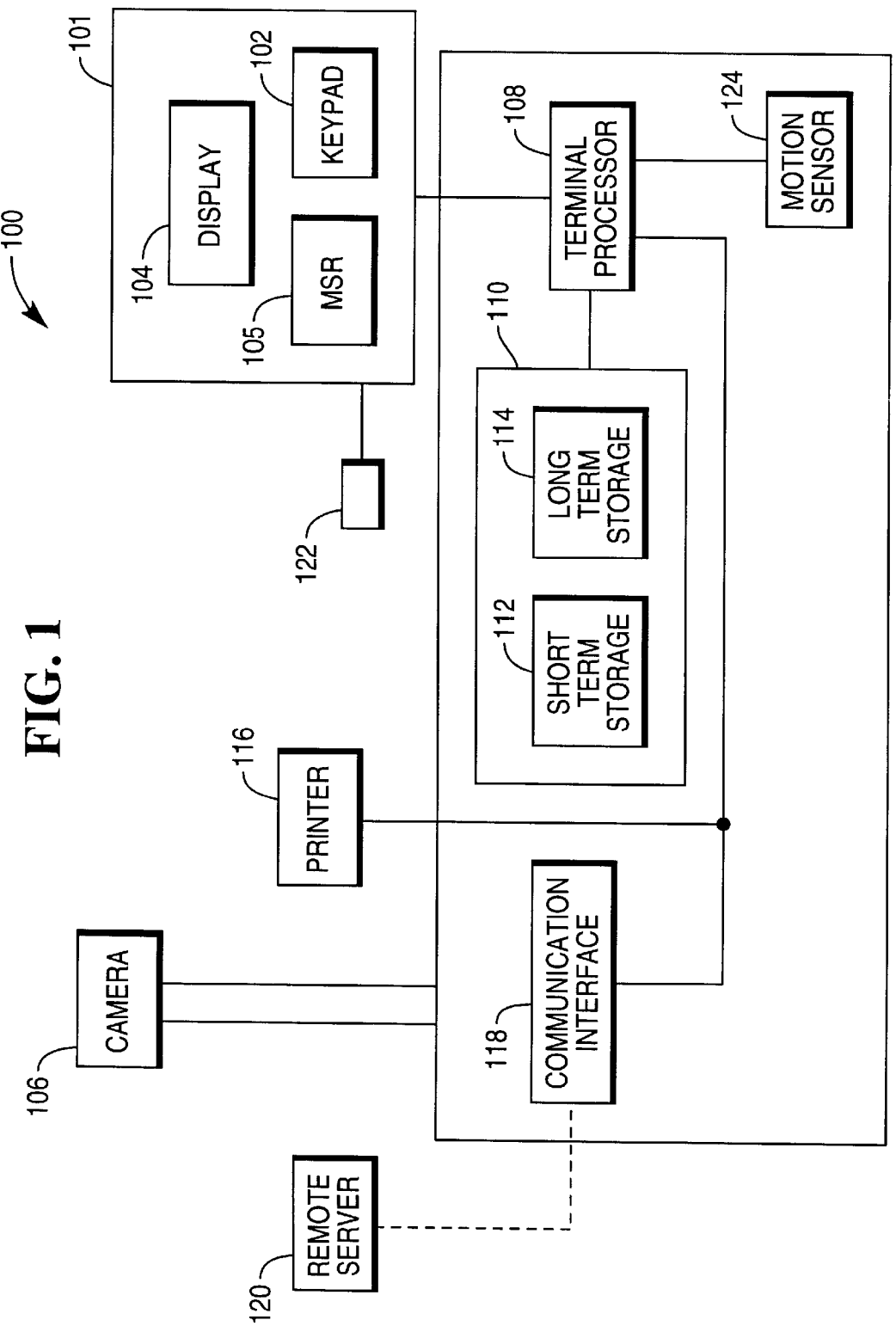
FIG. 1 illustrates a terminal having multiple format image capture capability according to the present invention.

FIG. 1 illustrates a terminal 100 having multi-mode image capture capability according to the present invention. The terminal 100 includes a customer interface 101, which includes a keypad 102 to allow user inputs and a display 104 for display of messages and other information to be presented to the customer. It will be recognized that the terminal 104 may be a touchscreen display used for inputting and displaying data. The customer interface 101 also includes a magnetic stripe reader 105 for reading magnetically encoded information from a credit or debit card, or from another type of customer identification card. The terminal 100 also includes a camera 106 adapted to operate in one of multiple video modes, each video mode producing video output in a different video format. The video mode in which the camera 106 operates depends on the actions being performed at the terminal 100.

The terminal 100 further includes a terminal processor 108 which controls operation of the terminal 100 and the response of the terminal 100 to customer commands, and processes video output produced by the camera 106. The terminal processor 108 has access to storage media 110 which includes short term storage or memory 112 and long term storage or memory 114. The terminal 100 also includes a printer 116 such as a receipt printer, and a communication interface 118 to allow communication between the terminal 100 and a remote server 120. This communication may occur over a radio link, a wired network, a packet-switched network such as the Internet, or any other suitable communication system.

In a typical self-service retail transaction, the camera 106 may operate in each of a number of video modes during the transaction. In an exemplary transaction in which the customer scans a universal product code label of a product, presents a credit card for payment and signs a charge receipt, the camera 106 may perform four different functions. At the beginning of the transaction, the camera 106 performs a barcode scan. In this scanning mode, the camera 106 captures an image of the barcode. The barcode image is retained in memory briefly while processing is performed to extract the information content of the barcode. This process is repeated for each item which a customer wishes to purchase. When a customer has finished presenting items for purchase, the customer is then presented with payment options. If the customer wishes to pay with a credit card, the customer presents the credit card for reading with the magnetic stripe reader 105. Once this is done, the customer presents the credit card for image capture by the camera 106. The camera 106 takes an image of the credit card, which is then stored in a digital graphic format. A receipt is then presented for signature by the customer. The camera 106 then changes to video movie mode in order to capture a video clip and records a video clip of the customer's signing of the receipt. Once the receipt has been signed, the camera 106 changes to video graphic mode and an image is taken of the signature, and this image is stored in a digital graphic format. If desired, the camera 106 may also present a live video feed of the customer, or the area around the terminal 100, which can be monitored remotely by store security personnel.

A terminal such as the terminal 100 may suitably be placed in a desired location within a retail establishment. The terminal 100 is typically connected to the remote server 120 which provides access to product information and which processes financial details of a transaction. The remote server 120 is adapted to receive and store video information transmitted from the terminal 100. The terminal 100 may be connected to the remote server 120 through a dedicated connection, a wireless radio communication system, an addressable network such as the Internet, or any other suitable communication method. Whatever communication method is used, suitable security precautions such as encrypting data or physically securing the connection are preferably taken to prevent compromise of retailer and customer information.

A customer may suitably approach the terminal 100 and initiate contact by making a keyboard entry, by selecting an icon on a touchscreen, or by using a pointing device such as a mouse 122. Alternatively, if the camera 106 is monitoring the vicinity of the terminal, the terminal 100 may automatically detect the presence of a person in the vicinity of the terminal 100 and may display a greeting asking if the customer wishes to begin a transaction. As a further alternative, the terminal 100 may be equipped with a motion sensor 124 to sense the approach of a customer. When the approach of a customer is detected by the motion sensor 124, the terminal is alerted to display the greeting. Depending on retailer needs, the terminal 100 may provide customers with an opportunity to purchase products by making selections using displays and menus presented by the terminal 100. For such selections, the products would be retrieved from storage and delivered to the customer at a pickup point, or shipped from a central location to a customer's home or other desired address.

The terminal 100 may be also be adapted to allow the customer to purchase a product which is physically brought to the terminal 100. In this case, the customer begins the transaction by issuing a command or selecting a menu entry, and is then prompted by the terminal to enter the product identification. This is most commonly done by scanning a universal product code located on the product. The customer places the universal product code within the field of view of the camera 106 and allows the camera 106 to capture an image of the product. The camera 106 then converts the image to digital format and delivers it to the terminal processor 108, which processes the image to extract the barcode information. The terminal processor 108 then processes the barcode information in a conventional manner in order to accomplish the transaction. If the customer has chosen a product directly from information presented by the terminal 100, no barcode is captured and no processing of barcode information is performed. Instead, the product is identified by communication between the terminal 100 and the remote server 120 without a need to capture and process a barcode image.

When the customer has finished entering products which it is desired to purchase, the terminal 100 directs the customer to present payment, for example in the form of a credit card. The customer passes or swipes the card through the magnetic stripe reader 122, and then places the card in the field of view of the camera 106. The credit card information is taken from the card using the magnetic stripe reader, and the terminal processor 108 sets the camera 106 to a video graphic mode. The camera 106 captures a video graphic image of the credit card and transmits it to the terminal processor 108, which associates the image with the transaction and processes it for storage. Next, a receipt is presented for signature by the customer and the terminal processor 108 directs the camera 106 to enter a video movie format mode in order to record an image of the customer's act of signing the receipt. Once signature has been accomplished, the terminal processor 108 receives and stores the video record of the act of signing and sets the camera 106 to the video graphic mode. The camera 106 then captures a video graphic image of the signature and transmits it to the terminal processor 108. The terminal processor 108 extracts sufficient information from the signature image to verify that a signature is present, and then associates the image with the transaction and processes it for storage. The terminal 100 may store the transaction information locally, or may transmit it to the server 120.

If desired, the camera 106 may be set to a live video feed mode to produce a continuous video stream for remote viewing. For example, during periods when the terminal 100 is not being used, it may be desired to use the camera 106 to monitor the area in the vicinity of the terminal 100 in order to detect shoplifting. In such a case, the terminal processor 108 would set the camera 106 to a live video feed mode and supply the video stream (for example, over a local area network) to a remote monitor being viewed by a security guard.

Figure 2:
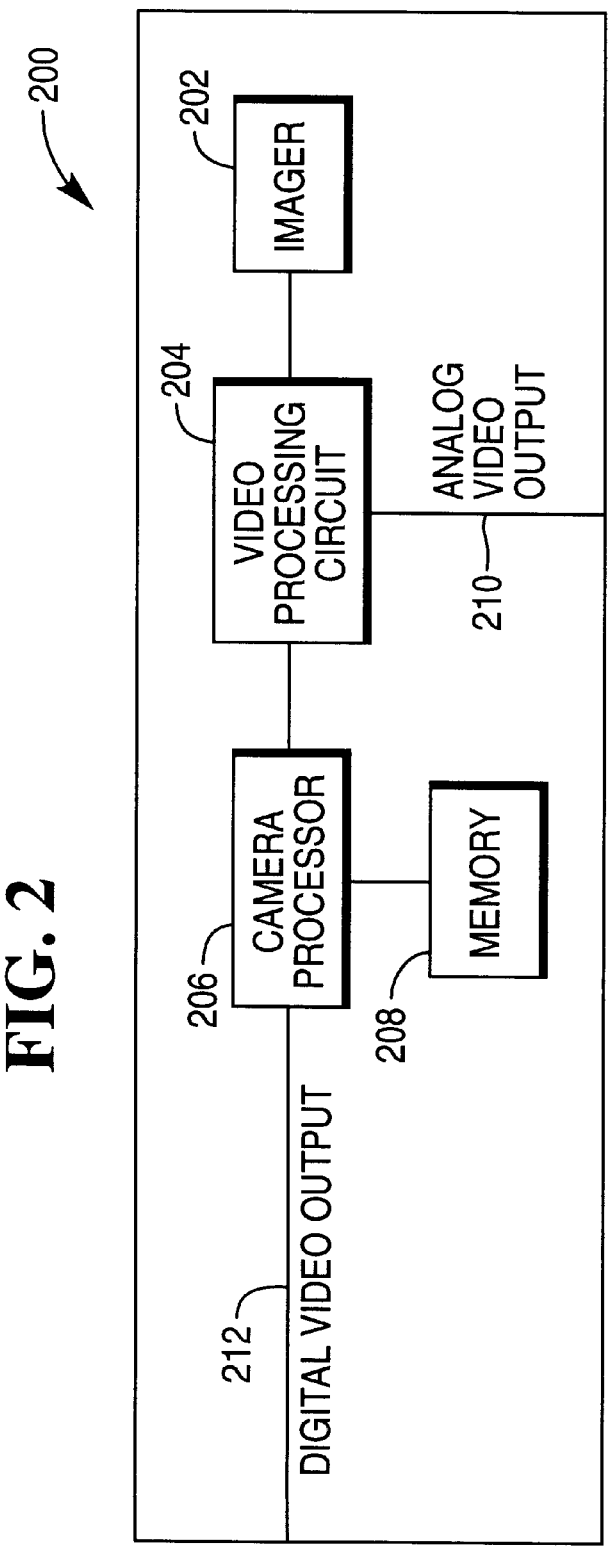
FIG. 2 illustrates further details of a camera providing multiple format image capture capability suitable for use in the terminal of FIG. 1.

FIG. 2 illustrates additional details of the camera 106 of FIG. 1. The camera 106 includes a CCD or CMOS imager 202. During use, the camera 106 is focused on an object so that a visual image of the object may be captured by the imager 202. The imager 202 produces a video output stream which may be used in analog format or which may be converted to digital format for processing or information extraction, or for storage. The camera 202 also includes a video processing circuit 204 which receives the video stream from the imager 202 and which directs the video stream or performs conversions as appropriate. In addition, the camera 106 further includes a camera processor 206 and memory 208. The camera processor 206 sends commands to the video processing circuit 204 in order to select the correct mode for the video output, and performs necessary processing of digital video output produced by the video processing circuit 204, as well as routing of the digital output to the memory 208 for temporary storage.

The camera 106 is capable of producing analog or digital video output depending on the camera mode. When analog output is desired, processor 206 directs the video processing circuit 204 to simply pass the video stream unchanged to an analog video output 210. When digital output is desired, the video processing circuit 204 receives the output of the imager and converts it to digital format. Once the video stream has been converted to digital format, it is processed further according to instructions received by the camera processor 206. Depending on instructions received by the camera processor 206, the processor 206 may convert the digital video stream to a video data format suitable for data extraction and pass it to a digital video output 212. Alternatively, the processor 206 may convert the video stream to a video graphic format for storage of a graphic image. The video graphic image is then passed to the digital video output 212. This allows the video graphic image to be received by another device such as the terminal processor 108 of FIG. 1, which may direct the video graphic image to be stored, for example, as part of a transaction record. The processor 206 may alternatively convert the video stream to a video movie format in order to produce a video clip of a customer's signing of a transaction receipt and pass the video stream to the digital video output 212. Alternatively, the processor 206 may produce a streaming video format for immediate examination, for example by security personnel or personnel designated to monitor transactions.

Figure 3:
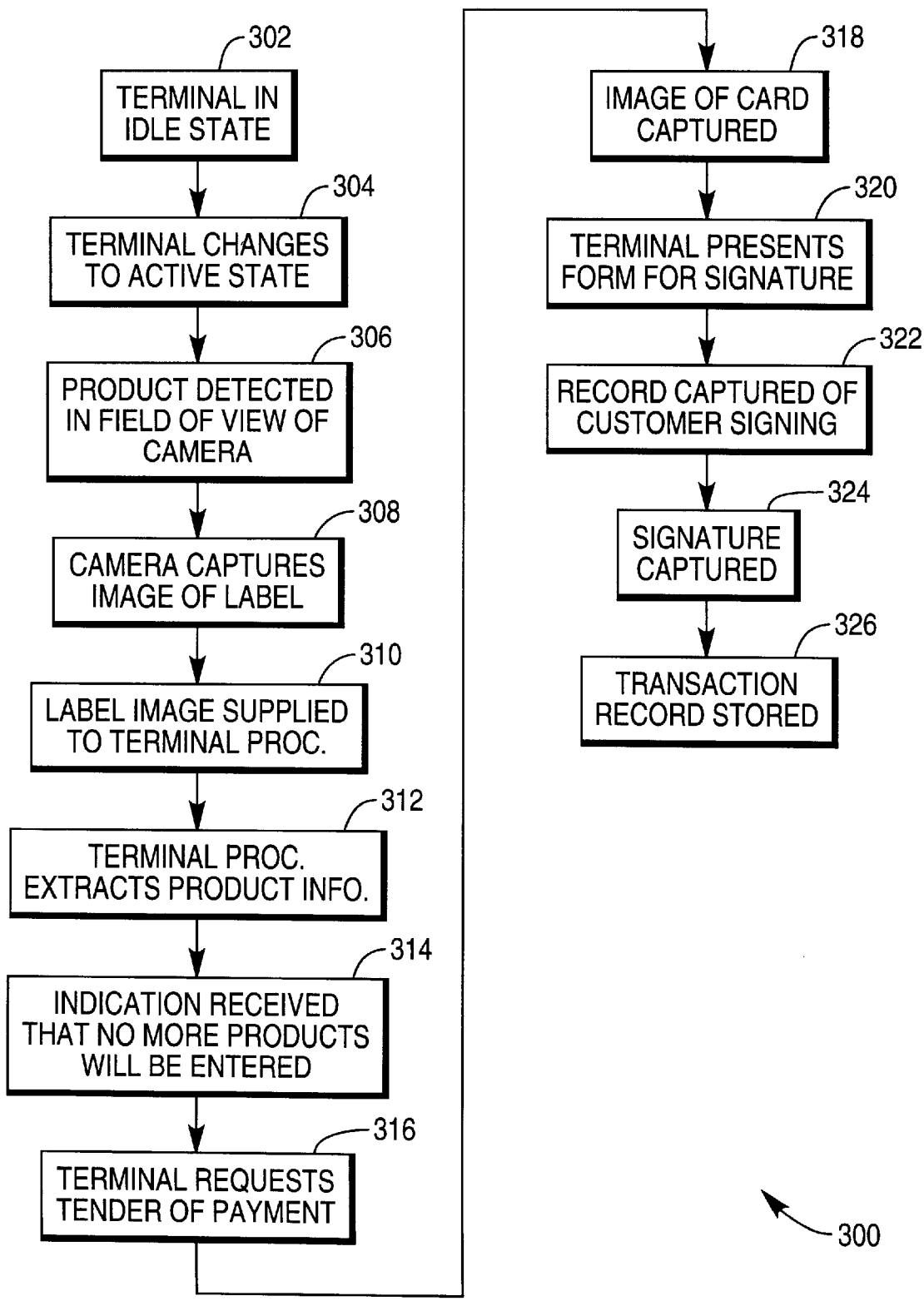
FIG. 3 illustrates a method of retail transaction processing including multiple format image capture capability according to the present invention.

FIG. 3 illustrates the steps of a method 300 of retail transaction processing employing multi-mode image capture and usage according to the present invention. At step 302, a self-serve terminal such as the terminal 100 of FIG. 1 is in an idle state awaiting the approach of a customer or other user. During the waiting time, a camera such as the camera 106, containing a multi-mode imager similar to the imager 202 of FIG. 2, supplies the video stream to a processor and optionally to a remote location such as a security station. The terminal may also display promotional and advertising messages. At step 304, in response to a customer's approach to the terminal, the processor recognizes the customer's presence by interpreting the video stream and changes to an active state, displaying a greeting and awaiting input from the customer. At step 306, in response to the placement of a product within the field of view of the camera, the processor interprets the video stream to recognize that a product is present. At step 308, the camera switches to video capture mode and captures an image of the barcode label. At step 310, the barcode label image is supplied to a processor within the terminal. At step 312, the processor extracts the product identification information from the barcode label. The processor then uses the product identification information to retrieve product information and enter it into a transaction. Steps 306 through 312 are repeated until the terminal receives at step 314 an indication that no more products are to be entered into the transaction. Next, at step 316, the terminal displays a request to the customer to tender payment and switches the camera to an image capture mode. At step 318, the camera captures a document image in a suitable video graphic format of a credit or debit card which is placed within the field of view of the camera, and passes the image to the processor which then associates the image with the transaction. Next, at step 320, the terminal presents a payment authorization form such as a charge receipt and displays a request that the customer sign the form. The form is within the field of view of the camera. At step 322, an image is captured of the customer's act of signing the form. After the customer signs the form, the process continues to step 324 and the camera captures a signature image of the signed form in a suitable video graphic format and passes the image to the processor, which then associates the image with the transaction. The process then proceeds to step 326 and a transaction record is stored along with the associated images.

While the present invention is disclosed in the context of a presently preferred embodiment, it will be recognized that a wide variety of implementations may be employed by persons of ordinary skill in the art consistent with the above discussion and the claims which follow below.

We claim:

1. A self-service retail terminal for conducting retail point of sale transactions comprising:
   a communication interface for communicating retail transaction information to and from a central processor;
   a multi-mode camera;
   a terminal processor controlling operation of the self-service terminal in response to customer inputs, the terminal processor receiving video information relating to stages of a transaction, the terminal processor selecting an operating mode for the multi-mode camera based on stages of the transaction;
   a customer interface for receiving the customer inputs;
   the multi-mode camera having a first mode to provide an image of an item to the terminal processor, said terminal processor operative to extract bar code information from the image to identify the item, said multi-mode camera having a second mode to provide an image of a financial card being used to pay for the item, and said multi-mode camera having a third mode to provide a video clip of a customer signing a financial receipt.

2. The self-service terminal of claim 1 wherein the multi-mode camera is operative to provide an image of the signed financial receipt to the terminal processor.

3. The self-service terminal of claim 1 the multi-mode camera further having a fourth mode to provide a continuous live video stream to a remote monitor.

4. The self-service terminal of claim 1 wherein the multi-mode camera produces output video in one of a plurality of formats.

5. The self-service terminal of claim 4 wherein the multi-mode camera selects one of the plurality of formats based on commands from the terminal processor.

6. The self-service terminal of claim 5 wherein the terminal processor issues said commands to the camera based on the stage of the transaction.

7. The self-service terminal of claim 2 further comprising a tangible storage medium for storing the image of the financial card, the image of the signed financial receipt and the video clip with a transaction record.

8. A self-service retail terminal for conducting retail point of sale transactions comprising:

a communication interface for communicating retail transaction information to and from a central processor;

a multi-mode camera;

a terminal processor controlling operation of the self-service terminal in response to customer inputs, the terminal processor receiving video information relating to stages of a transaction, the terminal processor selecting an operating mode for the multi-mode camera based on stages of the transaction;

a customer interface for receiving the customer inputs;

the multi-mode camera having a first mode to provide an image of an item to the terminal processor, said terminal processor operative to extract bar code information from the image to identify the item, said multi-mode camera having a second mode to provide a video clip of a customer signing a financial receipt, and said multi-mode camera having a third mode to provide an image of the signed financial receipt.

* * * * *